US012697644B2

(12) United States Patent
Binder

(10) Patent No.: US 12,697,644 B2
(45) Date of Patent: Aug. 4, 2026

(54) CLEANING DEVICE

(71) Applicant: Binder GmbH, Ulm (DE)

(72) Inventor: Robert Binder, Laichingen (DE)

(73) Assignee: BINDER GMBH, Ulm (DE)

( * ) Notice: Subject to any disclaimer, the term of this patent is extended or adjusted under 35 U.S.C. 154(b) by 44 days.

(21) Appl. No.: 18/591,672

(22) Filed: Feb. 29, 2024

(65) Prior Publication Data

US 2024/0198391 A1     Jun. 20, 2024

Related U.S. Application Data

(63) Continuation of application No. PCT/EP2022/073037, filed on Aug. 18, 2022.

(30) Foreign Application Priority Data

Sep. 1, 2021     (DE) ..................... 10 2021 122 630.9

(51) Int. Cl.
B08B 1/14 (2024.01)
B08B 3/02 (2006.01)
G01F 15/12 (2006.01)
(52) U.S. Cl.
CPC ................ B08B 1/143 (2024.01); B08B 3/02 (2013.01); G01F 15/12 (2013.01)
(58) Field of Classification Search
CPC ............ B08B 1/143; B08B 3/02; G01F 15/12
See application file for complete search history.

(56) References Cited

U.S. PATENT DOCUMENTS

| | | | |
|---|---|---|---|
| 5,419,190 A | 5/1995 | Boyd | |
| 5,515,734 A * | 5/1996 | Malminen ................. | G01P 5/08 |
| | | | 73/861.46 |
| 2002/0088872 A1* | 7/2002 | Hagiwara ............. | B24C 7/0076 |
| | | | 239/74 |
| 2005/0126604 A1* | 6/2005 | Shullman .................. | B08B 3/02 |
| | | | 134/34 |
| 2009/0214387 A1 | 8/2009 | Straub et al. | |

(Continued)

FOREIGN PATENT DOCUMENTS

| | | | | | |
|---|---|---|---|---|---|
| CN | 109985842 A | * | 7/2019 | ............... | B08B 3/02 |
| CN | 112179427 A | * | 1/2021 | ............... | G01F 1/58 |

(Continued)

OTHER PUBLICATIONS

CN109985842 translation (Year: 2020).*

(Continued)

*Primary Examiner* — Benjamin L Osterhout
*Assistant Examiner* — Lauren G Orta
(74) *Attorney, Agent, or Firm* — Reising Ethington P.C.

(57) ABSTRACT

A cleaning device for installation in a pipeline having a sensor unit which has at least one sensor tip; an elongated housing which has a first longitudinal end and a second longitudinal end and at least partially receives the sensor unit so that the sensor tip, in the measurement mode, protrudes at the second longitudinal end; and a wiping unit which is held in the housing so that it is movable in the longitudinal direction and has a wiping element, which is assigned to the sensor tip in such a way that the wiping element wipes along the sensor tip and thereby cleans it during a movement of the wiping unit.

17 Claims, 7 Drawing Sheets

(56) References Cited

U.S. PATENT DOCUMENTS

| | | | |
|---|---|---|---|
| 2011/0236962 A1 | 9/2011 | Loebbert et al. | |
| 2012/0024321 A1* | 2/2012 | Hays | B08B 3/10 |
| | | | 134/108 |
| 2013/0288359 A1 | 10/2013 | Loebbert et al. | |
| 2013/0291618 A1 | 11/2013 | Loebbert et al. | |
| 2020/0275004 A1* | 8/2020 | Condron | H04N 23/61 |

FOREIGN PATENT DOCUMENTS

| | | | | |
|---|---|---|---|---|
| CN | 212340334 U | 1/2021 | | |
| DE | 19839954 C1 * | 5/2000 | | G01F 15/12 |
| DE | 20005834 U1 | 7/2000 | | |
| DE | 102005051279 A1 | 5/2007 | | |
| DE | 102010001779 A1 | 8/2011 | | |
| EP | 0008041 A1 | 2/1980 | | |
| EP | 0008041 B1 * | 1/1982 | | G01K 13/02 |
| EP | 1402962 A2 | 3/2004 | | |
| JP | S50116450 U | 9/1975 | | |
| JP | S516754 A | 1/1976 | | |
| JP | H0550322 A | 3/1993 | | |
| JP | 2011086185 A | 4/2011 | | |
| WO | WO0014490 A1 | 3/2000 | | |
| WO | WO-2020012095 A1 * | 1/2020 | | B65G 47/847 |

OTHER PUBLICATIONS

CN112179427 translation (Year: 2019).*
DE19839954 translation (Year: 2000).*
WO2020012095 translation (Year: 2020).*
International Search Report and Written Opinion Issued for PCT/EP2022/073037 on Jan. 5, 2023.
Office Action Issued by the German Patent Office for application DE 10 2021 122 630.9 Jul. 8, 2022.
International Preliminary Report on Patentability Issued for PCT/EP2022/073037 on Mar. 5, 2024.

* cited by examiner

10

R

A-A

CLEANING DEVICE

CROSS REFERENCES TO RELATED APPLICATIONS

This application is a continuation of co-pending international patent application PCT/EP2022/073037 filed on Aug. 18, 2022 and designating the U.S., which claims priority of German patent application DE 10 2021 122 630.9 filed on Sep. 1, 2021.

FIELD

The present invention generally relates to a cleaning device for installation in a pipeline, as well as a method for the in-situ cleaning of at least one sensor tip of a sensor unit in a pipeline with a cleaning device.

BACKGROUND

Sensors are used in various technical fields in order, for example, to measure the flow rate of a particular medium which flows in a pipeline. The problem often arises in this case that the sensor tip of the sensor, which is exposed to the medium, becomes fouled and consequently delivers incorrect measurement values. In order to avoid such incorrect measurement values, the sensor tip needs to be cleaned at certain time intervals. For this purpose, it has previously been necessary to extract the entire sensor unit and cleanse it outside the pipeline. This procedure is very expensive.

SUMMARY

Against this background, an object of the present disclosure is to provide a way of cleaning the sensor tip of a sensor unit simply and economically.

This object is achieved by a cleaning device as defined in claim 1. The cleaning device has a sensor unit with at least one sensor tip. An elongated housing is furthermore provided, which has a first longitudinal end and a second longitudinal end and at least partially receives the sensor unit so that the sensor tip—in the measurement mode—protrudes at the second longitudinal end. Lastly, a wiping unit is provided, which is held in the housing so that it is movable in the longitudinal direction and has a wiping element, which is assigned to the sensor tip in such a way that the wiping element wipes along the sensor tip and thereby cleans it during a movement of the wiping unit.

This solution makes it possible that the sensor tip can be cleaned in the installed state inside the pipeline. The wiping element is for this purpose moved to and fro on the sensor tip, so as to mechanically abrade the dirt. The wiping element, so to speak, scrapes the dirt off from the sensor tip. Extraction of the sensor unit from the pipeline is therefore obviated. The cleaning process may be started manually from the outside or in an automated fashion, without intervention in the pipeline being necessary. The maintenance work is thereby simplified considerably and the downtimes of the overall plant in which the pipeline is installed are reduced.

The object of the present disclosure is therefore fully achieved.

In one preferred embodiment, a drive unit is provided, which can be connected to the wiping unit in order to move the wiping unit in the longitudinal direction. In other words, the drive unit can apply a force to the wiping unit and this force then leads to a movement in the housing, the wiping unit being guided by the housing. In order to apply this force, many options may be envisaged, although a hydraulic system has been found to be particularly preferred. By introducing a hydraulic liquid under pressure, the force required for the movement may be applied in order to displace the wiping unit relative to the sensor tip.

The wiping unit for this purpose preferably has a cylinder space, in which a piston element that separates the cylinder space into a first and a second chamber is provided. Preferentially, the piston element is connected to the sensor unit. In this preferred embodiment, if a medium, for example hydraulic liquid, is introduced into the first chamber, a movement of the wiping unit relative to the piston element on which the sensor element is fitted takes place. The wiping element moves slightly out of the housing, so that the wiping element slides over the sensor tip and carries out the cleaning.

Preferentially, a spring is provided in the second chamber, which returns the wiping unit into a starting position. In this starting position, the sensor tip is no longer covered by the wiping unit, so that the sensor unit has its full functionality. In this position of the wiping unit, unperturbed measurement by the sensor unit is consequently possible inside the pipeline.

Furthermore preferentially, a hydraulic line is provided inside the housing, which can be connected at its one end to the hydraulic drive unit and is connected at its other end to a hydraulic channel inside the wiping unit, the hydraulic channel opening into the first chamber of the cylinder space. Preferentially, the hydraulic line is configured as a line which is flexible at least in portions, for example as a hose line, so that the line can follow the movement of the wiping unit.

In one preferred embodiment, at least one cleaning nozzle is provided, two cleaning nozzles preferably being provided, which are aligned in the direction of the sensor tip. In order to supply these cleaning nozzles, a line for a cleaning liquid is preferentially provided inside the housing, which can be connected at its first longitudinal end to a supply line and is connected at its second longitudinal end to a channel that extends inside the wiping element as far as the at least one cleaning nozzle.

The advantage of these cleaning nozzles is that the sensor tip may, for example, be sprayed with a cleaning liquid before the mechanical cleaning, in order to dislodge the dirt at least partially. The subsequent mechanical cleaning may then achieve a significantly better outcome.

Preferentially, the one or more cleaning nozzles are provided in a U-shaped carrier element, preferably in the base of this carrier element, the base lying at a distance from the wiping element and a space in which the sensor tip lies—in the measurement mode—being defined between them.

The advantage of this carrier element may be considered to be that the cleaning nozzles can be aligned better with the sensor tip. Since the two branches of the U-shaped carrier element extend in the flow direction, they do not present an obstacle for the measurement so that the medium in the pipeline can flow well around the sensor tip.

In one preferred embodiment, the wiping element is fitted replaceably on the wiping unit. The wiping element may therefore be replaced easily after corresponding wear. Furthermore preferentially, the wiping element has at least one wiping spring. This wiping spring is used to finally and cleanly remove fine deposits or dirt on the sensor tip. Preferentially, the wiping element is made from a metallic and non-rusting material, in which case the material should be suitable (for example it does not corrode) in its pairing with the material of the sensor tip, for example stainless steel and Hastelloy. Particularly preferentially, the material is selected from the following materials: Hastelloy®, titanium, C63000, duplex steel. Alternatively, ceramic materials or sintered materials may also be used.

In one preferred embodiment, the wiping element has an opening for the sensor tip, the circumferential edge of which is configured as a blade so that mechanical cleaning of the surface of the sensor tip takes place during a relative movement of the sensor tip and the wiping element. This configuration has the advantage that the entire circumference of the sensor tip can be cleaned reliably, and even stubborn dirt can be scraped off by the blade-like configuration. It would of course also be conceivable to make the wiping element smaller, and instead to hold it so that it can be rotated about the longitudinal axis of the sensor tip. In order to clean the entire circumference of the sensor tip, the wiping element would then need to be rotated slightly for each downward movement.

In one preferred embodiment, the drive unit is provided as a mobile drive unit. In other words, the drive unit is not a fixed constituent part of the cleaning device but is only attached to the cleaning device for cleaning when required. The drive unit for this purpose has a pump which can pump hydraulic liquid in a controlled way from a container for this liquid into the hydraulic line of the cleaning device, so as to correspondingly build up pressure in the first chamber and move the wiping unit. Preferentially, the mobile drive unit additionally has a container for cleaning liquid and a pump for introducing the cleaning liquid into the corresponding line of the cleaning device. Furthermore preferentially, the mobile drive unit has a controller which makes it possible automatically to run a predefined cleaning program, which may comprise a plurality of cleaning steps.

As an alternative thereto, the drive element with the aforementioned elements may also be connected permanently to the cleaning device so that the sensor tip may be cleaned at any time.

An object of the present disclosure is also achieved by a method for the in-situ cleaning of at least one sensor tip of a sensor unit in a pipeline with a cleaning device, wherein the wiping element is moved to and fro one or more times in the longitudinal direction by means of the drive unit so that the wiping element slides along the sensor tip and cleans it. Preferentially, the sensor tip is sprayed with a cleaning liquid before or after the aforementioned mechanical cleaning. Preferentially, this process of spraying the sensor tip with a cleaning liquid and mechanical cleaning is carried out several times in succession.

It is to be understood that the features mentioned above and the features yet to be explained below may be used not only in the combination respectively indicated but also in other combinations or individually, without departing from the scope of the present invention.

DESCRIPTION OF THE DRAWINGS

Further advantages and configurations may be found in the description and the appended drawings, in which.

DESCRIPTION OF PREFERRED EMBODIMENTS

Figure 1:
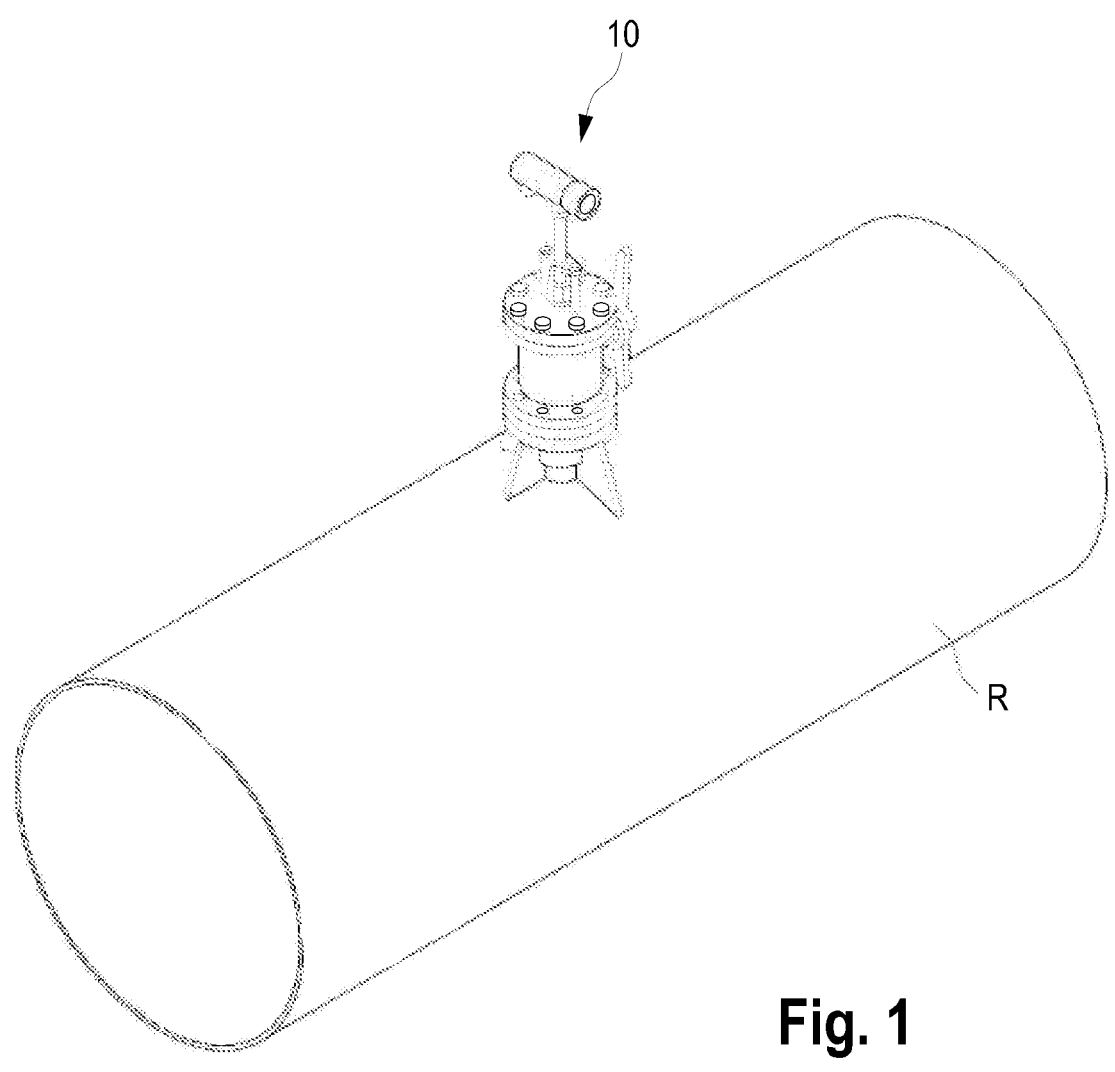
FIG. 1 shows a perspective representation of a portion of a pipeline, in which a cleaning device according to the present disclosure is installed.

FIG. 1 shows a perspective view of a portion of a pipeline R, which is part of a larger plant. For example, a gaseous medium, for example air, flows through the pipeline if the plant is for example a purification plant. In order to control the flow of air in the pipeline, it is necessary to measure certain parameters, for example the flow rate. Sensors, for example flow sensors, which protrude into the interior of the pipeline are used for this purpose. In FIG. 1, such a sensor is contained in a cleaning device 10 which protrudes with one part into the pipeline R and the other part of which is outside the pipeline, and can be seen in the figures. This cleaning device 10, which will be explained in detail below, is releasably connected to the pipeline R by means of a flange.

Figure 2:
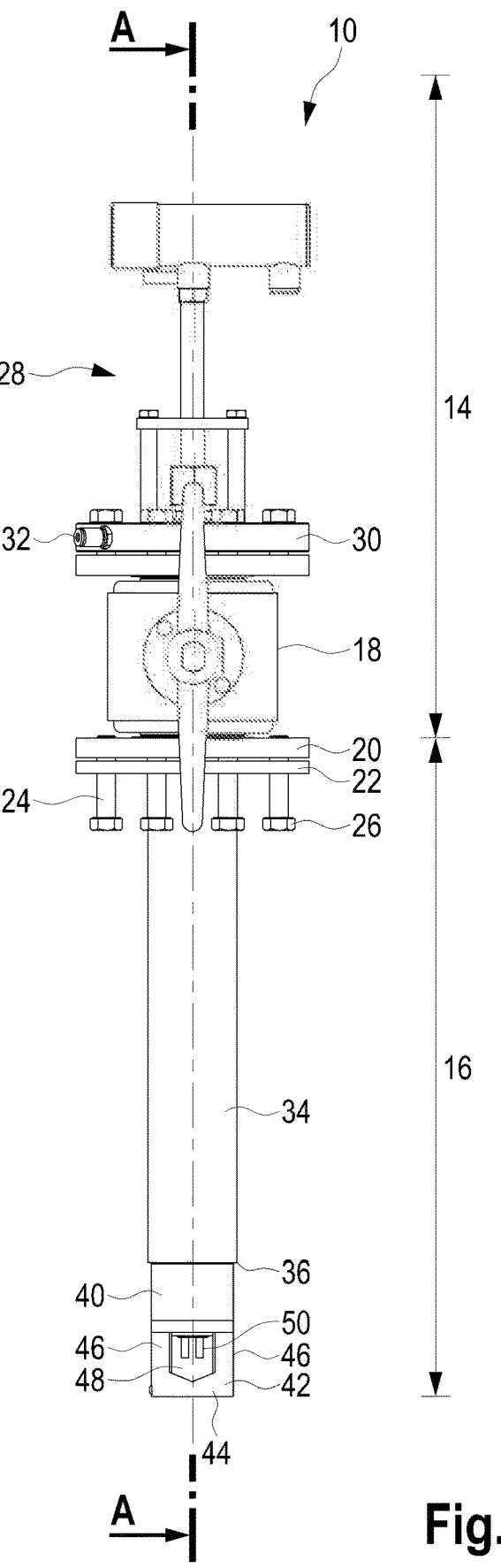
FIG. 2 shows a side view of the cleaning device.

FIG. 2 in turn represents the cleaning device 10 in a side view. As already explained above, the cleaning device 10 is divided into two portions 14, 16, the upper portion 14 being located outside the pipeline in the installed state and the lower portion 16 inside the pipeline.

The upper portion 14 has a ball cock 18, which can be connected by means of a flange 20 to a flange 22 of the lower portion 16. A plurality of threaded bolts 24 and hex nuts 26 are provided for the connection. The ball cock 18 allows the entire device to be extracted from the pipeline, for example for repair purposes, in which case the resulting opening may then be closed with the ball cock. The upper portion 14 furthermore has a region 28, which is used on the one hand for the media supply and on the other hand as an exit for the measurement signal lines. This region 28 is likewise connected to the ball cock 18 by means of a flange 30. The flange 30 for its part has at least two attachment couplings 32 for media, one attachment coupling 32 being visible in FIG. 2.

A tubular housing 34 extends starting from the flange 22 of the lower portion 16 and ending at a lower longitudinal end 36. The housing 34 is configured to be open at the lower longitudinal end 36, and at least partially receives a wiping unit 40. As shown in FIG. 2, the wiping unit 40 has a tubular housing, the shape of which is matched to the inner contour of the housing 34. The matching is carried out in particular in such a way that the wiping unit 40 can be moved, or displaced, in the longitudinal direction in the housing 34. For example, the outer diameter of the housing of the wiping unit 40 corresponds to the inner diameter of the housing 34.

Fitted at the lower end of the wiping unit 40, there is a U-shaped carrier element 42, the base 44 of which is at a distance from the lower end of the wiping unit 40. There is therefore a flow channel 48, laterally delimited by the two branches 46 of the carrier element, inside which the flow measurement may for example take place by means of sensor elements. FIG. 2 shows by way of example the tip 50 of a sensor element, which protrudes into this channel 48.

Figure 3:
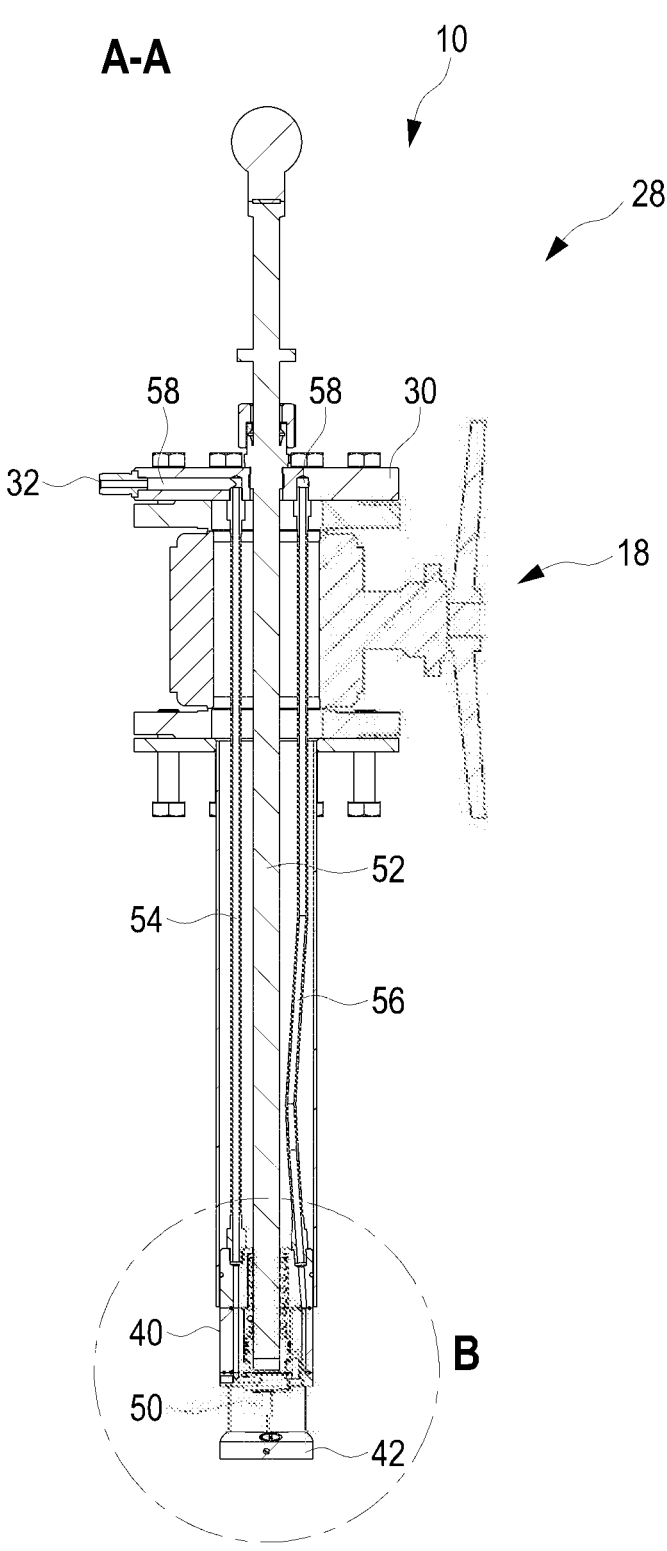
FIG. 3 shows a sectional view along the line A-A of FIG. 2.

The elements which are provided in particular inside the housing 34 of the lower portion 16 may be seen in the sectional view of FIG. 3. A sensor unit 52, at the lower end of which the sensor tip 50 is located, thus extends inside the housing 34. In the present exemplary embodiment, two sensor tips 50 are provided. As may furthermore be seen from FIG. 3, the sensor unit 52 extends through the ball cock 18 and through the flange 30 of the upper region 28.

The housing furthermore receives two lines 54, 56, which extend from the flange 30 through the ball cock 18 as far as the wiping unit 40. The two lines 54, 56 are configured to be flexible at least in portions, for example as a hose, so that movement of the wiping unit 40 inside the housing 34 is not impeded by these lines.

In the present embodiment, the line 54 is used to supply a hydraulic oil, whereas the other line 56 carries a cleaning liquid, for example water, turpentine, cleaning naphtha, diluent, etc. The two lines 54, 56 each open into a channel 58 in the flange 30, the two channels 58 for their part each ending in an attachment coupling 32. The aforementioned media may be supplied from the outside through this attachment coupling 32 by attaching corresponding lines with couplings.

Figure 4:
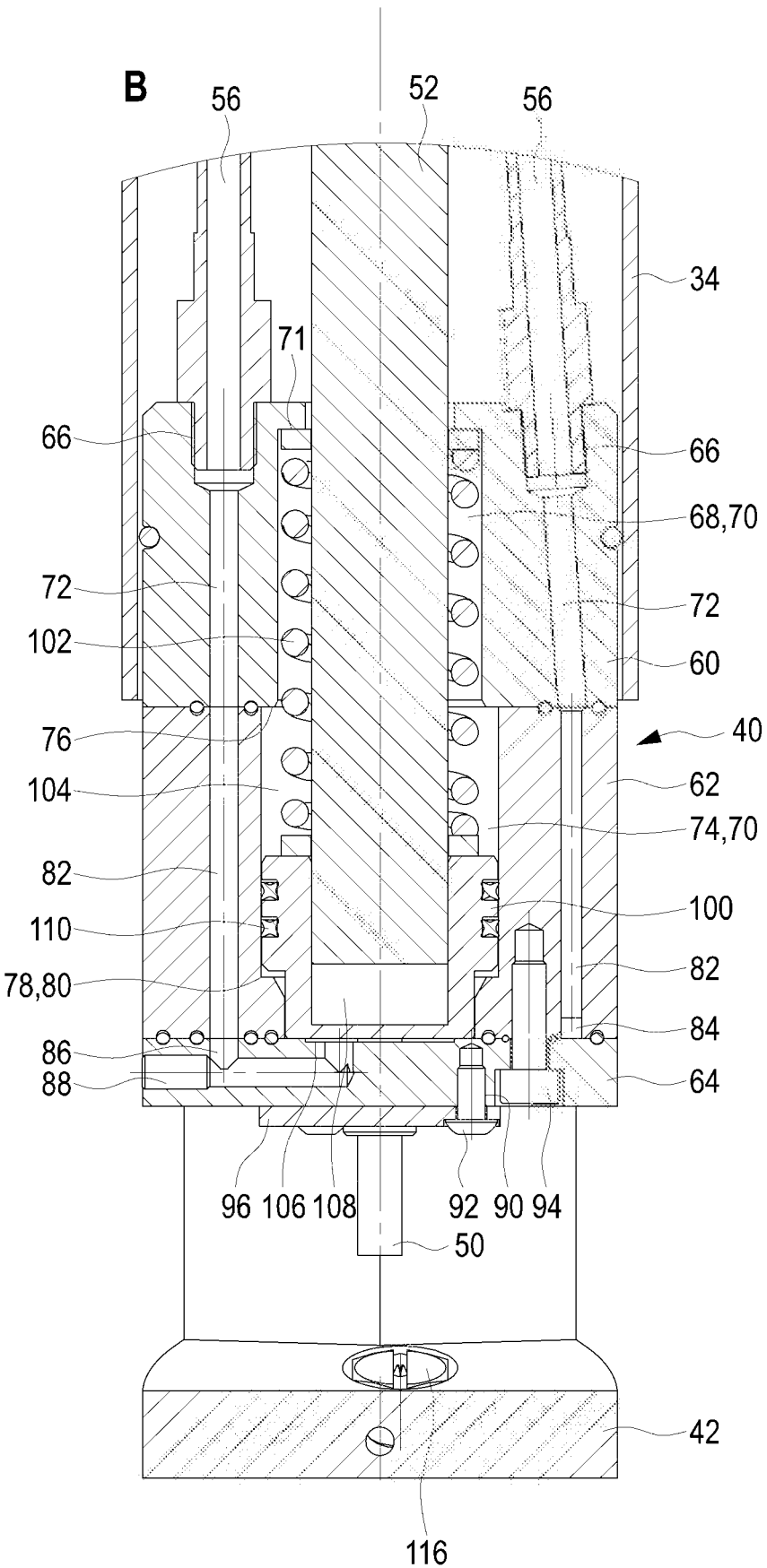
FIG. 4 shows a sectional view of the region B of FIG. 3.

FIG. 4 shows in particular the wiping unit 40 in an enlarged representation. The wiping unit 40 is received at least in portions in the housing 34 of the cleaning device 10 and is guided in such a way that a movement, or displacement, is possible in the longitudinal direction in the housing 34.

The wiping unit 40 is divided into three longitudinal portions 60, 62 and 64, which are connected to one another in this order, for example by screwing. All three longitudinal portions 60, 62, 64 are configured cylindrically, their outer diameters being equal and substantially corresponding to the inner diameter of the housing 34. The upper longitudinal portion 60 in FIG. 4 respectively has an attachment 66 on its upper side for the line 54 or the line 56. The two lines 54, 56 are preferably screwed into the attachments 66. It may furthermore be seen in FIG. 4 that the two attachments 66 open into corresponding channels 72, which extend as far as the lower end of the corresponding longitudinal portion 60.

A bore 68, which forms part of a cylinder space 70 inside the wiping unit 40, is provided coaxially in the upper longitudinal portion 60. The bore 68 extends through the entire length of the longitudinal portion 60, and has an inner diameter D1 which is reduced to a smaller inner diameter D2 at the upper end. This creates a shoulder 71 inside the bore 60.

The central longitudinal portion 62 likewise has a bore 74, which is part of the cylinder space 70. The inner diameter D3 of the bore 74 in the upper region is greater than the inner diameter D1 of the bore 68, so that a shoulder 76 is formed. The inner diameter D3 is constant as far as a point 78 at which the inner diameter is reduced to a smaller value D4, so that a shoulder 80 is likewise created here.

Like the upper longitudinal portion 60, the central longitudinal portion 62 also has two channels 82, which extend over the entire length of the central longitudinal portion and the upper ends of which are flush with the channels 72. In this way, the media supplied through the lines 54, 56 can be conveyed as far as the lower end of the central longitudinal portion.

A downwardly open channel 84 is also provided at the lower side of the central longitudinal portion 62 and extends along a circular segment in order to convey the medium to a plurality of openings in the lower longitudinal portion 64.

The lower longitudinal portion 64 has a channel 86, which is supplied by the channel 82. The channel 86 extends inside the lower longitudinal portion 64 and opens into the cylinder space 70 of the central longitudinal portion 62. A screw 88 is provided laterally in order to vent this channel.

A screw 94, with which the lower longitudinal portion 64 is screwed to the central longitudinal portion 62, may also be seen from the sectional view in FIG. 4. It should be understood that a plurality of these screws 94 are provided. The lower longitudinal portion 64 furthermore has a concentric bore, through which the sensor tip 50 extends downwards. Lastly, a wiping element 96 is screwed on the lower side of the lower longitudinal portion 64 by means of one or more screws 92.

The wiping element 96 has an opening for the sensor tip 50 and is designed so that the edge of this opening makes contact with the sensor tip. This edge, which may be designed in the form of a blade, is used to abrade dirt on the sensor tip 50, this process being explained in more detail below.

Provided in the cylinder space 70 of the central longitudinal portion 62, there is a piston element 100 which has a substantially cylindrical shape and has a first portion with an outer diameter D3 and a second portion with an outer diameter D4. The movement of the piston element 100 relative to the wiping unit 40 is limited by the two shoulders 76 and 80 inside the bore 74 of the central longitudinal portion 62.

Provided inside the cylinder space 70, there is a spring 102 which is braced on the one hand on the shoulder 71 and on the other hand on the upper side of the piston element 100. The spring applies a force, which is directed downwards in FIG. 4, onto the piston element 100. In particular, the spring 102 ensures that the piston element 100, or the wiping unit 40, is guided into a starting position in which the sensor tip 50 is exposed in the channel 48 and measurements can thus be carried out.

The piston element 100 separates the cylinder space 70 into an upper chamber 104 and a lower chamber 106. In the starting position shown in FIG. 4, the volume of the lower chamber 106 is minimal and that of the upper chamber 104 is maximal.

If hydraulic oil is introduced through the line 54 and at the end through the channel 86 into the lower chamber 106 of the cylinder space 70, however, for example with a pressure of 3-7 bar, the volume increases by the wiping unit 40 being moved downwards relative to the housing 34 against the force of the spring 102. If the pressure generated by the hydraulic oil in the lower chamber 106 is reduced, the spring 102 returns the wiping unit 40 into the starting position shown in FIG. 4.

The piston element 100 has a bore 108, which is provided concentrically and receives the lower end of the sensor unit 52, in particular its tubular housing. The piston element 100 is connected firmly to the sensor unit 52, so that a relative movement is not possible between the two elements. In order to pass the sensor tip 50 through, the piston element 100 has a corresponding bore at the lower end, although these are not shown in FIG. 4.

As already briefly explained above, a relative movement is possible between the piston element 100 and the wiping unit 40. Since the housing 34, sensor unit 52 and piston element 100 form a unit which is static (including in relation to the pipeline R) in the installed state of the cleaning device, the wiping unit 40 consequently moves when hydraulic oil is introduced under pressure into the lower chamber 106.

In order to separate the two chambers 104 and 106 pressure-tightly from one another, the piston element 100 has a plurality of sealing rings 110, two sealing rings in the exemplary embodiment shown, which bear on the inner wall of the bore 74.

Figure 5:
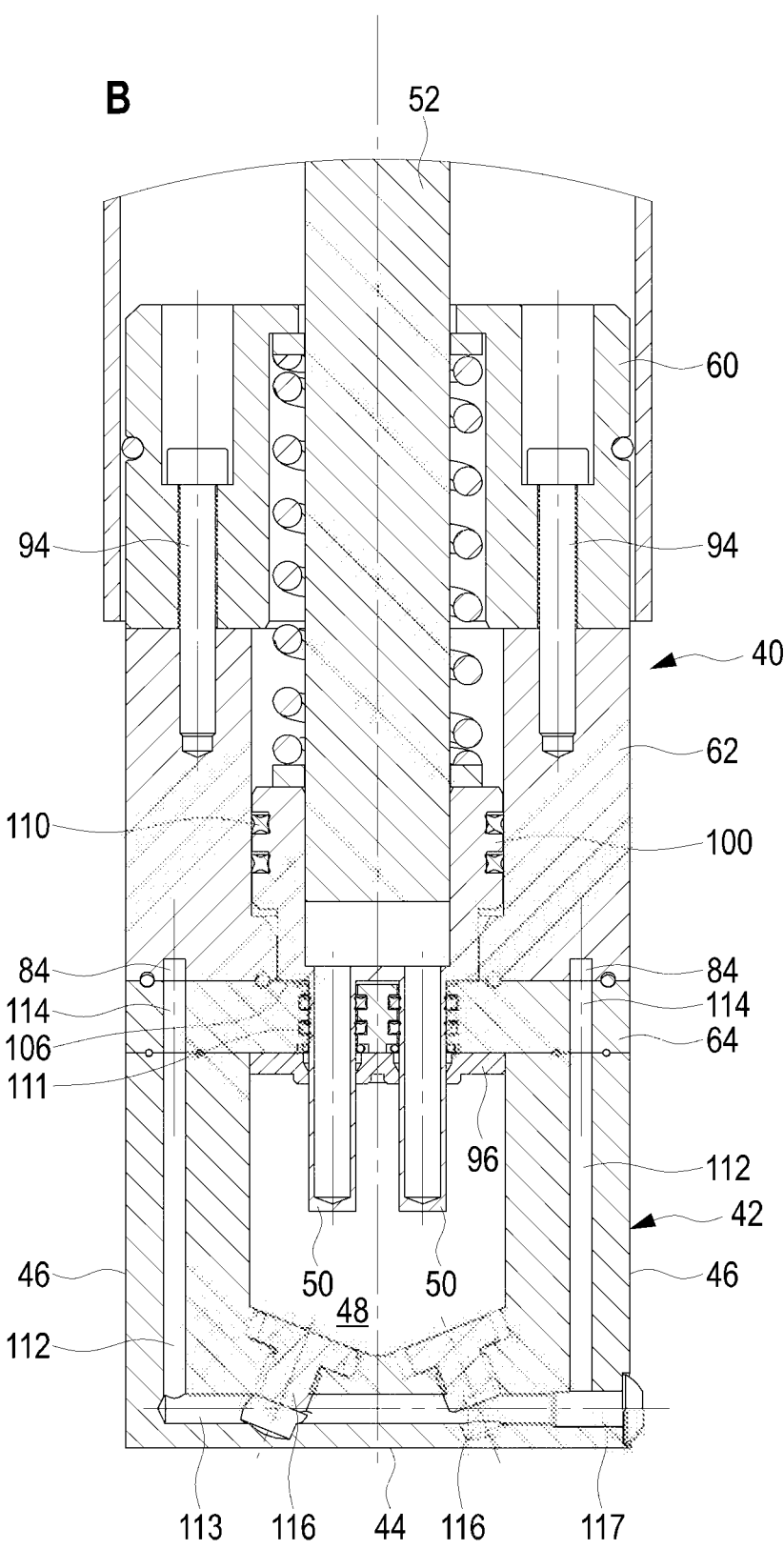
FIG. 5 shows a sectional view of the region B of FIG. 3 rotated through 90°.

The wiping unit 40 of FIG. 4 is shown once more in FIG. 5, but in a section rotated through 90° (rotation about the longitudinal axis). For simplicity, the same references are used to denote components which are the same, in order to be able to avoid repeated explanation of these components.

It may be seen clearly from FIG. 5 that the sensor unit 52 has two sensor tips 50, which extend through openings in the piston element 100 and the lower longitudinal portion 64 into the channel 48. In order to seal the lower chamber 106 from the channel 58, a plurality of sealing rings 111 are provided in the two bores for the sensor tips 50.

Provided on the lower side of the lower longitudinal portion 64 of the wiping unit 40, there is the carrier element 42, in the two branches 46 of which channels 112 are provided which on the one hand open into a channel 113 in the base 44 and on the other hand are in fluid connection with the channel 84 in the central longitudinal portion 62 via corresponding channels 114 in the lower longitudinal portion 64.

Two cleaning nozzles 116, which can be supplied with a cleaning liquid through one channel 113 or two separate channels 113, are preferably provided in the base 44 of the carrier element 42. The cleaning nozzles 116 are aligned differently, in such a way that they can spray cleaning liquid onto the sensor tip 50. In the present exemplary embodiment, the spray axes of the two cleaning nozzles 116 each have an angle of not more than 45° with respect to the longitudinal axis.

It may also be seen from the sectional representation in FIG. 5 that the channel 113 can be vented by means of a screw 117. It can also be seen that the upper longitudinal portion 60 is connected by means of screws 94 to the central longitudinal portion 62 of the wiping unit 40.

Figure 6A:
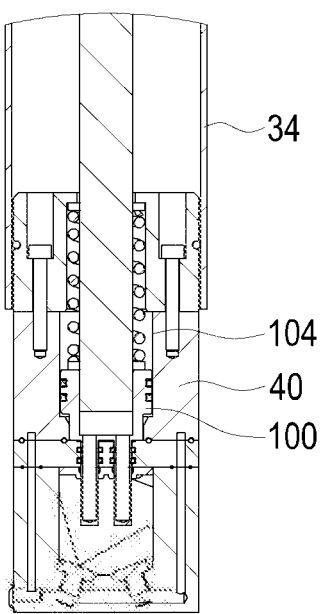
FIGS. 6A, 6B each show schematic representations to explain the movement of the wiping unit inside the housing.

As already explained above, a movement of the wiping unit 40 downwards, that is to say out of the housing 34, may be induced by introducing hydraulic oil into the lower chamber 106. This movement is represented in the two FIGS. 6A and 6B. The upper FIG. 6A shows the wiping unit 40 in the starting position, or measurement position, as has already been shown in FIGS. 4 and 5. If hydraulic oil is now introduced into the lower chamber 106, the volume of this lower chamber 106 increases, as may be seen in FIG. 6B. The wiping unit 40 moves downwards out of the housing 34 according to the arrow P, but only so far that at least a portion of the wiping unit 40 remains in the housing 34 and the wiping unit 40 is therefore also held in this "extracted" position.

Figure 6B:
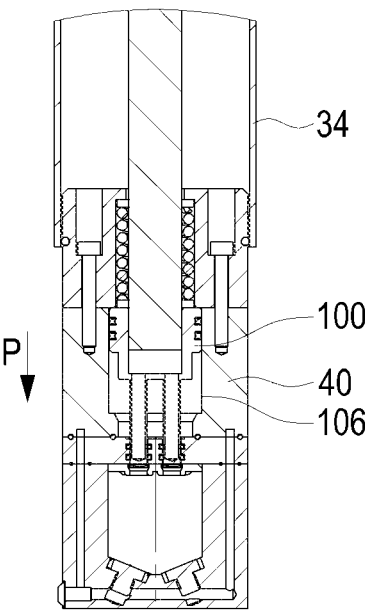

It may be seen clearly in FIG. 6B that, in the extracted position of the wiping unit 40, the two sensor tips 50 are fully received in the cylinder space 70 and the two bores in the lower longitudinal portion 64. Expressed in other words, the entire region of the sensor tips 50 lying in the channel 48 has been moved along the wiping element 96. By the particular configuration of the wiping element 96, mechanical cleaning of the sensor tips 50 takes place because of this movement. Dirt present on the sensor tips 50 can therefore be removed by scraping.

Figure 7:
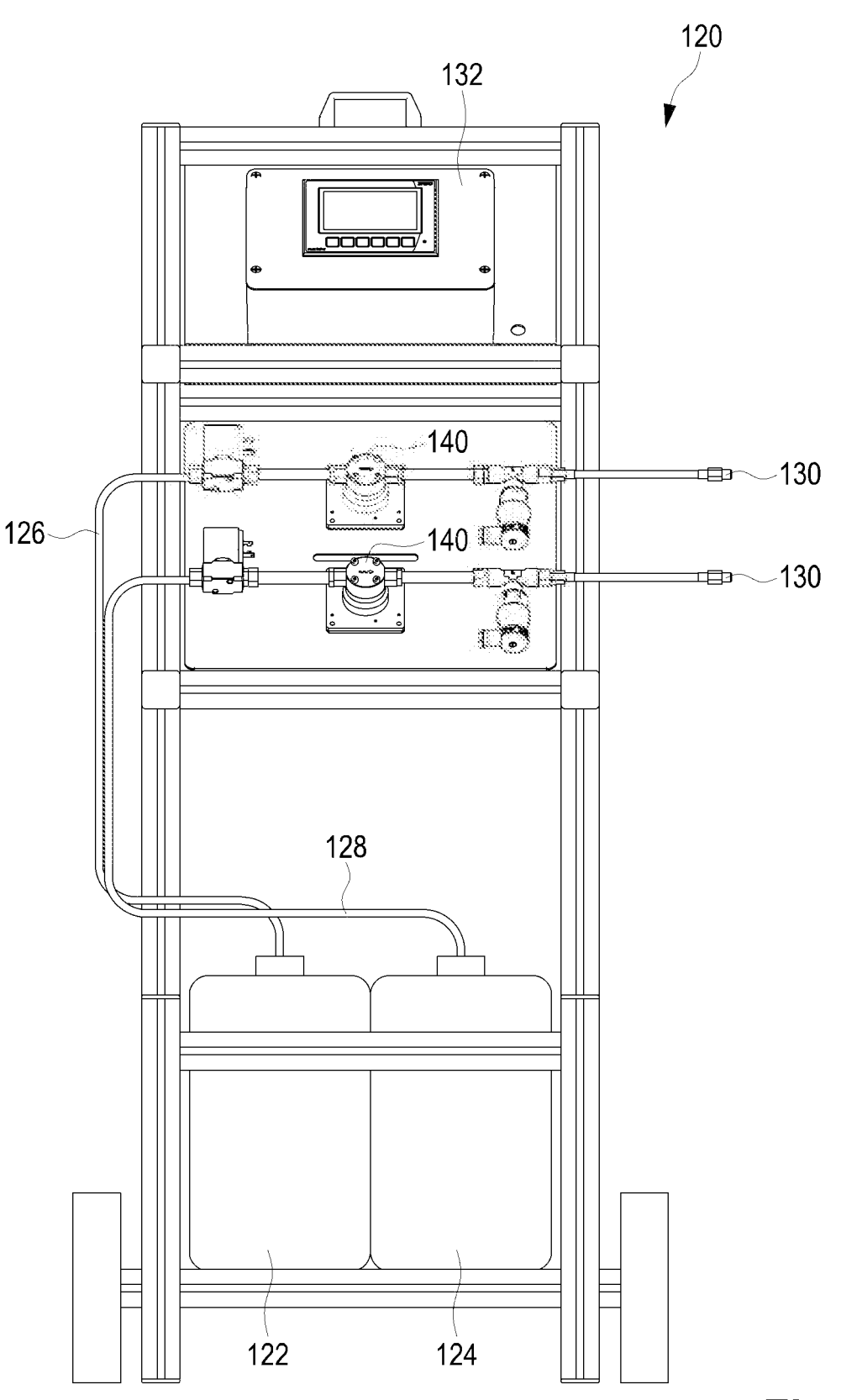
FIG. 7 shows a schematic representation of a mobile unit which can be attached to the cleaning device.

FIG. 7 represents a mobile unit 120, which has a plurality of components for driving the wiping unit 40 (drive unit) and for spraying cleaning liquid through the nozzles 116. Two containers 122 and 124 are provided, which respectively store the hydraulic oil and the cleaning liquid. Lines 126, 128, which can be connected by means of attachment couplings 130 to the attachment couplings 32 of the cleaning device 10, extend from the containers 122, 124. Pumps 140, which can be controlled by means of a pump controller 132, are respectively provided in the two lines 126, 128. The pump controller 132 can store various cleaning processes, which may be selected and started manually or automatically.

At this point, it should be mentioned that the mobile unit 120 may also be provided as a stationary unit, which is then permanently connected to one or more cleaning devices 10.

The process of cleaning the sensor tip 50 will now briefly be explained.

First, the lines 126, 128 are attached by means of the couplings 130 to the attachment couplings 32 of the cleaning device 10.

The pump for the cleaning liquid is then activated in order to spray cleaning liquid onto the sensor tips 50. Substantially the entire circumference is wetted with cleaning liquid because of the corresponding alignment of the two cleaning nozzles 116.

After a certain action time, which may be adjusted by means of the pump controller, the pump for hydraulic oil is activated. The hydraulic oil is pumped into the lower chamber 106 of the wiping unit 40, for example with a pressure of up to 7 bar. The wiping unit 40 is thereby moved downwards so that the wiping element 96 slides along the circumference of the sensor tip 50. The dirt softened by the cleaning liquid is thereby mechanically abraded. After deactivation of the pump, the spring 102 returns the wiping unit 40 into the starting position, the sensor tips also being cleaned by means of the wiping element 96 during this movement.

Depending on the degree of fouling, the wiping unit 40 may be moved to and fro repeatedly in order to perform the mechanical cleaning process several times. This may also be predefined in the pump controller. Moreover, the process of cleaning with the cleaning liquid may of course also be performed repeatedly.

It can be seen that in-situ cleaning of the sensor tip is possible with the described cleaning device, without the sensor unit needing to be extracted. A great deal of time may therefore be saved, and the downtimes of the plant may be reduced.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A cleaning device for installation in a pipeline, comprising:

a sensor unit which has at least one sensor tip;

an elongated housing which has a first longitudinal end and a second longitudinal end and at least partially receives the sensor unit so that the sensor tip, in the measurement mode, protrudes at the second longitudinal end; and a wiping unit which is held in the housing so that it is movable in the longitudinal direction and has a wiping element, which is assigned to the sensor tip in such a way that the wiping element wipes along the sensor tip and thereby cleans it during a movement of the wiping unit;

wherein the wiping unit has a cylinder space and a piston element provided therein, the piston element being connected to the sensor unit and separating the cylinder space into a first and a second chamber.

2. The cleaning device according to claim 1, further comprising a drive unit which is connectable to the wiping unit in order to move the wiping unit in the longitudinal direction.

3. The cleaning device according to claim 2, wherein the drive unit is a hydraulic drive unit which is provided to pump a hydraulic medium into the first chamber of the cylinder space in order to move the wiping unit in the longitudinal direction in the housing.

4. The cleaning device according to claim 2, wherein the wiping element is fitted replaceably on the wiping unit.

5. The cleaning device according to claim 2, wherein the drive unit is a mobile drive unit, which has at least one pump for the hydraulic liquid and at least one pump for a cleaning liquid, a container respectively for the two liquids and a control circuit for controlling the pumps.

6. The cleaning device according to claim 1, wherein the wiping unit has a spring which is provided in the second chamber of the cylinder space and interacts with the piston element.

7. The cleaning device according to claim 1, wherein a hydraulic line which runs inside the housing and is flexible at least in portions is connectable at one end to a hydraulic drive unit and is connectable at another end to a hydraulic channel inside the wiping unit, the hydraulic channel opening into the first chamber of the cylinder space.

8. The cleaning device according to claim 1, wherein at least one cleaning nozzle, which is aligned in the direction of the sensor tip, is provided.

9. The cleaning device according to claim 8, wherein two cleaning nozzles arranged next to one another are provided, the alignments of which are different.

10. The cleaning device according to claim 8, wherein a line for a cleaning liquid, which runs inside the housing and is flexible at least in portions, is connectable at a first longitudinal end to a supply line and is connected at a second longitudinal end to a channel that extends inside the wiping unit as far as the at least one cleaning nozzle.

11. The cleaning device according to claim 1, wherein the wiping element consists of a metallic, non-rusting or ceramic material.

12. The cleaning device according to claim 1, wherein the wiping element has at least one wiping spring.

13. The cleaning device according to claim 1, wherein the sensor unit has a sensor for measuring the flow of gaseous media.

14. The cleaning device according to claim 1, wherein the wiping element has an opening for the sensor tip, the circumferential edge of which is configured as a blade so that mechanical cleaning of the surface of the sensor tip takes place during a relative movement of the sensor tip and the wiping element.

15. A method for the in-situ cleaning of at least one sensor tip of a sensor unit in a pipeline with a cleaning device according claim 1, wherein the wiping element is moved to and fro one or more times in the longitudinal direction by means of the drive unit so that the wiping element slides along the sensor tip and cleans it.

16. A method according to claim 15, wherein the sensor tip is sprayed with a cleaning liquid before or after the cleaning with the wiping element.

17. A cleaning device for installation in a pipeline, comprising:

a sensor unit which has at least one sensor tip;

an elongated housing which has a first longitudinal end and a second longitudinal end and at least partially receives the sensor unit so that the sensor tip, in the measurement mode, protrudes at the second longitudinal end; and a wiping unit which is held in the housing so that it is movable in the longitudinal direction and has a wiping element which is assigned to the sensor tip in such a way that the wiping element wipes along the sensor tip and thereby cleans it during a movement of the wiping unit, wherein at least one cleaning nozzle, which is aligned in the direction of the sensor tip, is provided, and wherein a U-shaped carrier element, which receives the at least one cleaning nozzle on its base, is provided on the wiping unit, the base of the carrier element lying at a distance from the wiping element and a space in which the sensor tip lies, in the measurement mode, is defined between them.

* * * * *